United States Patent [19]

Henein et al.

[11] Patent Number: 5,360,322
[45] Date of Patent: Nov. 1, 1994

[54] HYDRAULIC PUMP DRIVEN BY AN ELECTRIC MOTOR

[75] Inventors: Nabil Henein, Darmstadt; Wilhelm Beer, Ruesselsheim; David Vile, Bad Homberg, all of Germany

[73] Assignee: Alfred Teves GmbH, Germany

[21] Appl. No.: 969,257

[22] PCT Filed: May 26, 1992

[86] PCT No.: PCT/EP92/01178
 § 371 Date: Feb. 22, 1993
 § 102(e) Date: Feb. 22, 1993

[87] PCT Pub. No.: WO93/00513
 PCT Pub. Date: Jan. 7, 1993

[30] Foreign Application Priority Data

Jun. 22, 1991 [DE] Germany .................. 4120665

[51] Int. Cl.$^5$ .................................. F04B 21/00
[52] U.S. Cl. ........................ 417/313; 417/410.1
[58] Field of Search ......... 417/410 R, 423.1, 423.7, 417/423.8, 423.9, 423.14, 313

[56] References Cited

U.S. PATENT DOCUMENTS

| 4,684,329 | 8/1987 | Hashimoto | 417/366 |
| 4,834,623 | 5/1989 | Triolo et al. | 417/366 |
| 4,838,769 | 6/1989 | Gannaway | 417/366 |
| 4,854,829 | 8/1989 | Stanzani et al. | 417/360 |

*Primary Examiner*—Richard E. Gluck
*Assistant Examiner*—Alfred Basichas
*Attorney, Agent, or Firm*—Robert P. Seitter; J. Gordon Lewis

[57] ABSTRACT

The invention is a hydraulic pump driven by an electric motor which is distinguished by a compact and easily assembled structure. The control apparatus, the electric motor, the hydraulic pump section, the tank, the filter, and the resonator are accommodated within one housing. The hydraulic pump of the present invention includes a modular type of structure, special types of motors, such as a motor without commutator or a "dipped" motor, and is well suited for use in compact spaces in hydraulic systems of automotive vehicles.

10 Claims, 5 Drawing Sheets

HYDRAULIC PUMP DRIVEN BY AN ELECTRIC MOTOR

BACKGROUND OF THE INVENTION

The invention is related to a hydraulic pump driven by an electric motor in which the control apparatus, the electric motor and the hydraulic pump section are accommodated within a housing. A similar pump which serves as a fuel transfer pump is known from the German published patent application No. 3,700,664 A1. This pump is housed in a fuel tank which has a relatively large space, consequently, the pump is not particularly space-saving as to its set-up. In particular, a large filter is arranged beside the pump.

In other hydraulic pumps which supply hydraulic pressure fluid, for example, a power steering system or an anti-lock device in automotive vehicles, a compact structure is of special importance due to the restricted space which is available in for example the engine compartment.

SUMMARY OF THE INVENTION

It is, therefore, an object of the present invention to configurate a hydraulic pump being driven by an electric motor in such a way that it requires distinctly less space than state-of-the-art pumps and offers, moreover, ease of mounting due to an integration of all elements.

The invention provides a hydraulic pump having a housing that accommodates the control apparatus, the electric motor, the hydraulic pump section, a tank, a resonator if used and a filter if used. The hydraulic section, the electric motor and the control apparatus, which includes an electrical connector are formed in modules and are adapted to be joined together. This structure is inexpensive to manufacture.

According to a further object of this invention, the hydraulic section and the control apparatus, to which the motor brushes are fixed as well as the electric connection, constitute a pre-assembled unit to which the electric motor can be joined. This guarantees, in addition, a good cooling of the control apparatus by the hydraulic pressure agent since the control apparatus and the hydraulic section are positioned directly beside each other.

A still more compact type of construction results when the electric motor is a motor without commutator since this type of motor is smaller than a commutator motor.

It is a further object of the present invention to position the rotor of the electric motor in the hydraulic fluid. This affords the telescoping of various component parts since any separation of the electric motor and the hydraulic section is dropped. The saving of the pump-side bearing of the rotor of the motor also means a reduction in size and of costs of the motor-and-pump assembly.

In another preferred embodiment, the control apparatus is integrated into the electric motor, respectively into a portion of its housing.

Advantageously, the pump is preferably designed in the shape of a slot-controlled radial piston pump with an optimum utilization of space being achieved by an expedient arrangement of the supply and discharge ducts as well as of the filters.

The inventive pump is provided for use in a hydraulic system of an automotive vehicle, in particular in an electrohydraulic power steering system, in a brake unit with slip control or in a hydraulic chassis control system.

In the following, the invention will be described making reference to a plurality of embodiments which are illustrated in the accompanying drawings.

DETAILED DESCRIPTION OF THE INVENTION

Figure 1:
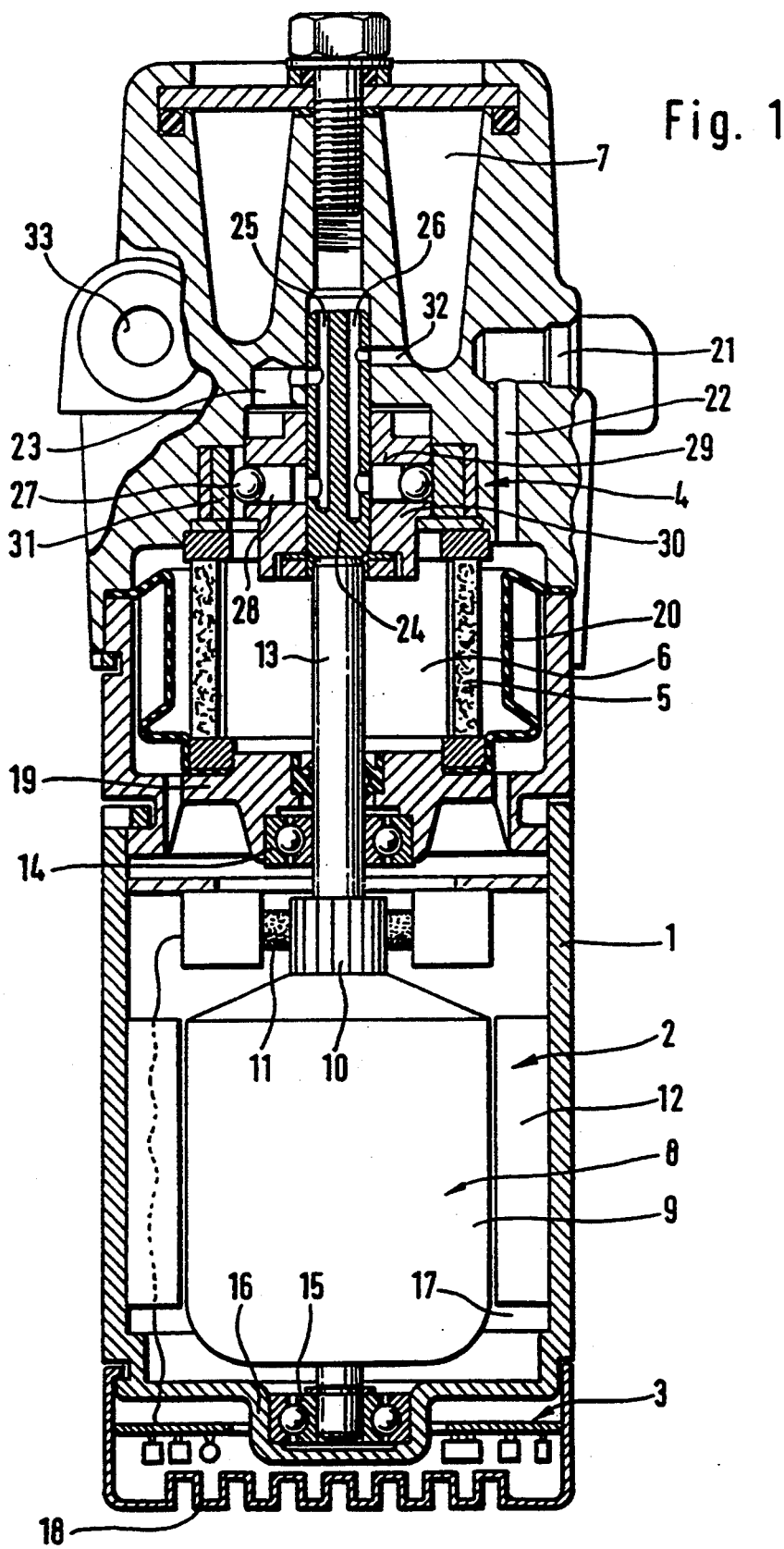
FIG. 1 shows a hydraulic system in which all elements are accommodated within a sub-divided housing.

For simplicity sake identical elements are given identical reference numerals, and only those details which are essential for a complete understanding of the invention will be described.

The assembly in FIG. 1 consists of an electric motor 2, a control apparatus 3, a hydraulic pump section 4, a filter 5, a tank 8 and a resonator 7 which are accommodated within a housing 1. The electric motor 2 is substantially comprised of a rotor 8 with a winding 9 and a commutator 10, motor brushes 11 and magnets 12. On either side of the motor 2, the motor shaft 13 is supported in bearings 14, 15.

The bearing 15 is positioned in a section 18 of the housing 1 which separates the motor compartment 17 from the control apparatus 3. Cooling ribs 18 are provided on the outside of the housing 1 for cooling of the control apparatus 3. The bearing 14 is inserted in the partition wall 18 between the motor 2 and the hydraulic section 4. Partition wall 19 is penetrated by the motor shaft 13 which is sealedly guided therein. Furthermore, a flexible diaphragm 20 defining the tank 8 is fixed to the partition wall 19.

The tank 6 is divided by the filter 5. The hydraulic pressure fluid flows from the inlet connection 21 through the axial duct 22 into the external tank range between the diaphragm 20 and the filter 5, from there into the internal tank range and through a further duct 23 to the suction side of the pump 4.

The pump 4 represents a slot-controlled radial piston pump, a suction duct 25 and a discharge duct 28 being configured in the control shaft 24. The pistons are configured in the shape of spherical pistons 27 with sealing element 28 and are slidingly guided in bores 29 of the pump rotor 30. The pump rotor 30 is coupled to the motor shaft 13 and rotates jointly with the latter. The spherical pistons 27 ride on the eccentric strap 31 being eccentrically incorporated in the housing 1 and convey hydraulic pressure agent from the suction duct 25 into the discharge duct 28. The hydraulic pressure fluid passes from there through the radial duct 32 into the resonator 7 which is connected through a duct, not shown in the drawing, to the outlet connection 33.

In the remaining figures, only the differences from the hydraulic pump described above will be discussed in order to avoid unnecessary repetition.

Figure 2:
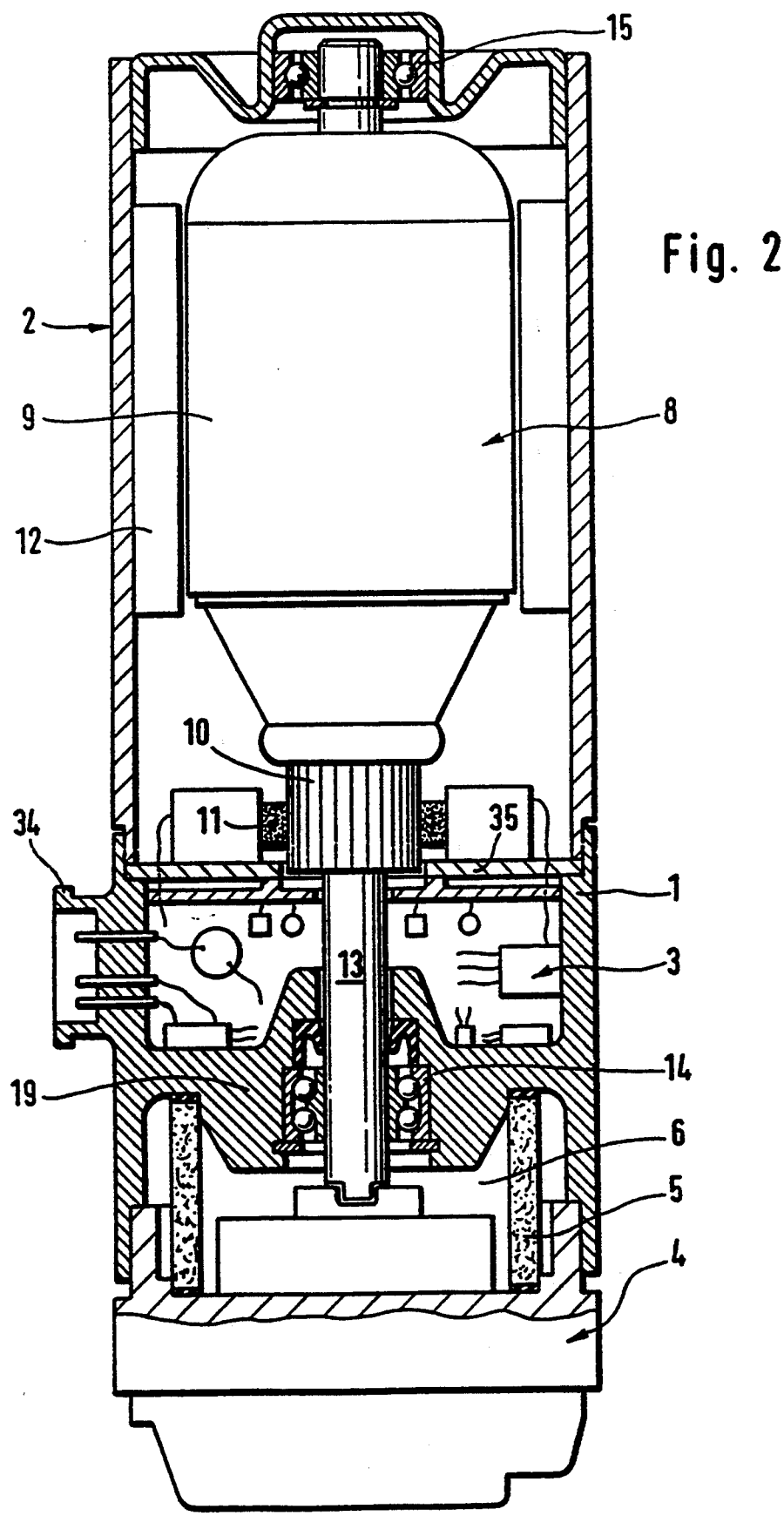
FIG. 2 shows a hydraulic pump in which the control apparatus is arranged between the hydraulic section and the electric motor.

In FIG. 2 the control apparatus 3 is positioned between the hydraulic section 4 and the motor 2. It will be noticed that the electric motor 2, the control apparatus 3 and the hydraulic section 4 are each forming one module which can be manufactured separately and subsequently coupled to the other modules.

Beyond the control apparatus 3, a plug 34 is integrated in the housing 1 for connection to a source of electromotive force and to signal lines. The motor section is closed by a plate 35 which bears the brush 11. It will be particularly expedient to provide the motor-and-pump assembly illustrated in FIG. 2 as a motor module and a hydraulic-section-and-control-apparatus module since, in that case, all parts can be pre-assembled and the filter 5 will be firmly retained between the control apparatus 3 and the hydraulic section 4.

Figure 3:
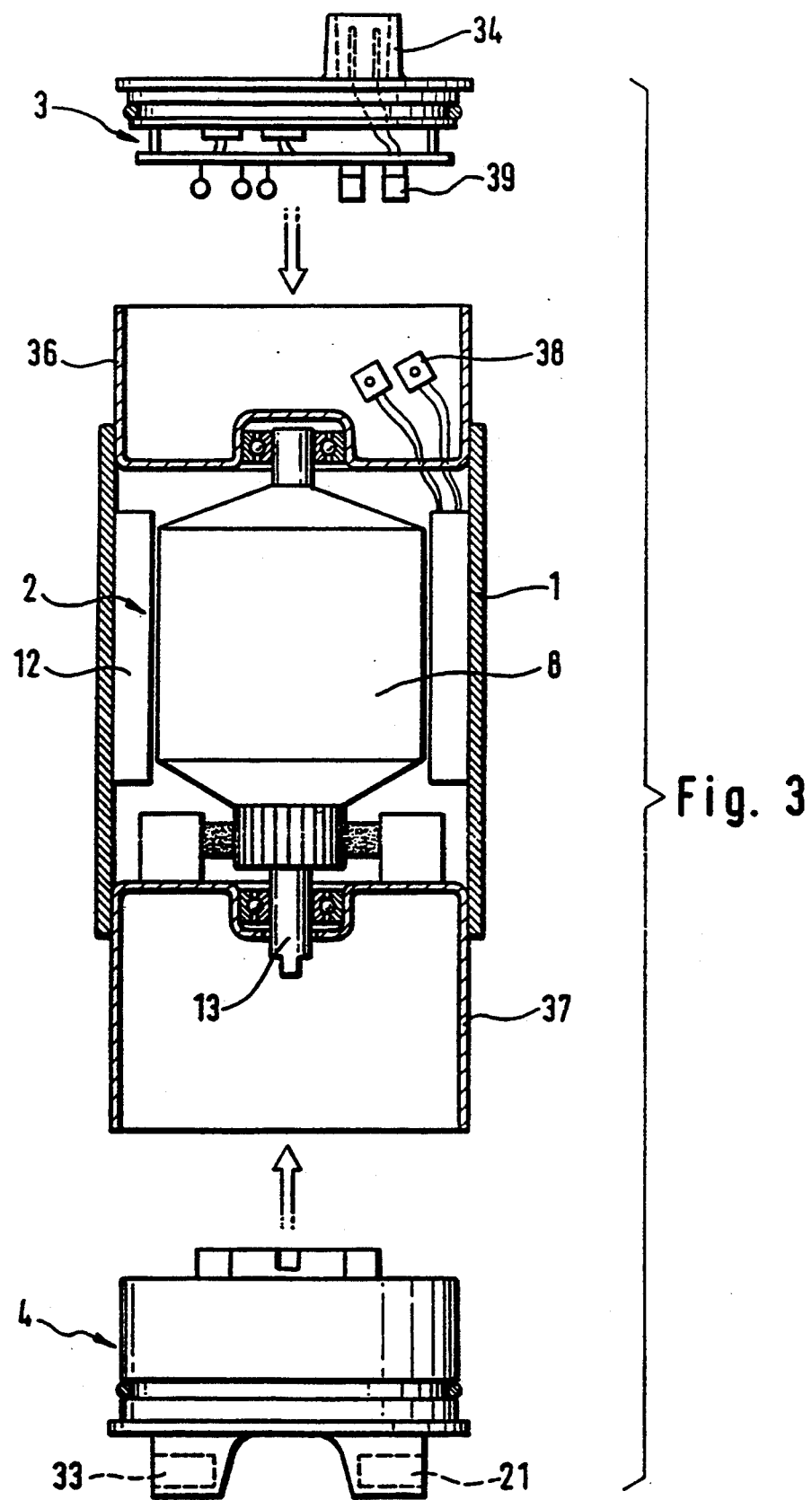
FIG. 3 shows the assemblage of the modules in an exploded view.

FIG. 3 shows another motor-and-pump assembly having a modular type of structure. The housing 1 includes the motor housing with two cylindrical projections 38, 37 for accommodating the control apparatus 3 and the hydraulic section 4. In the projection 38 an electrical connection 38 is provided in order to connect the motor 2 to the control apparatus 3, respectively to the latter's electric connection 38. The hydraulic section 4 and the control apparatus 3 are firmly retained in the projections 38, 37 by indentations, mortisings or flanging of the edges of the projections.

Figure 4:
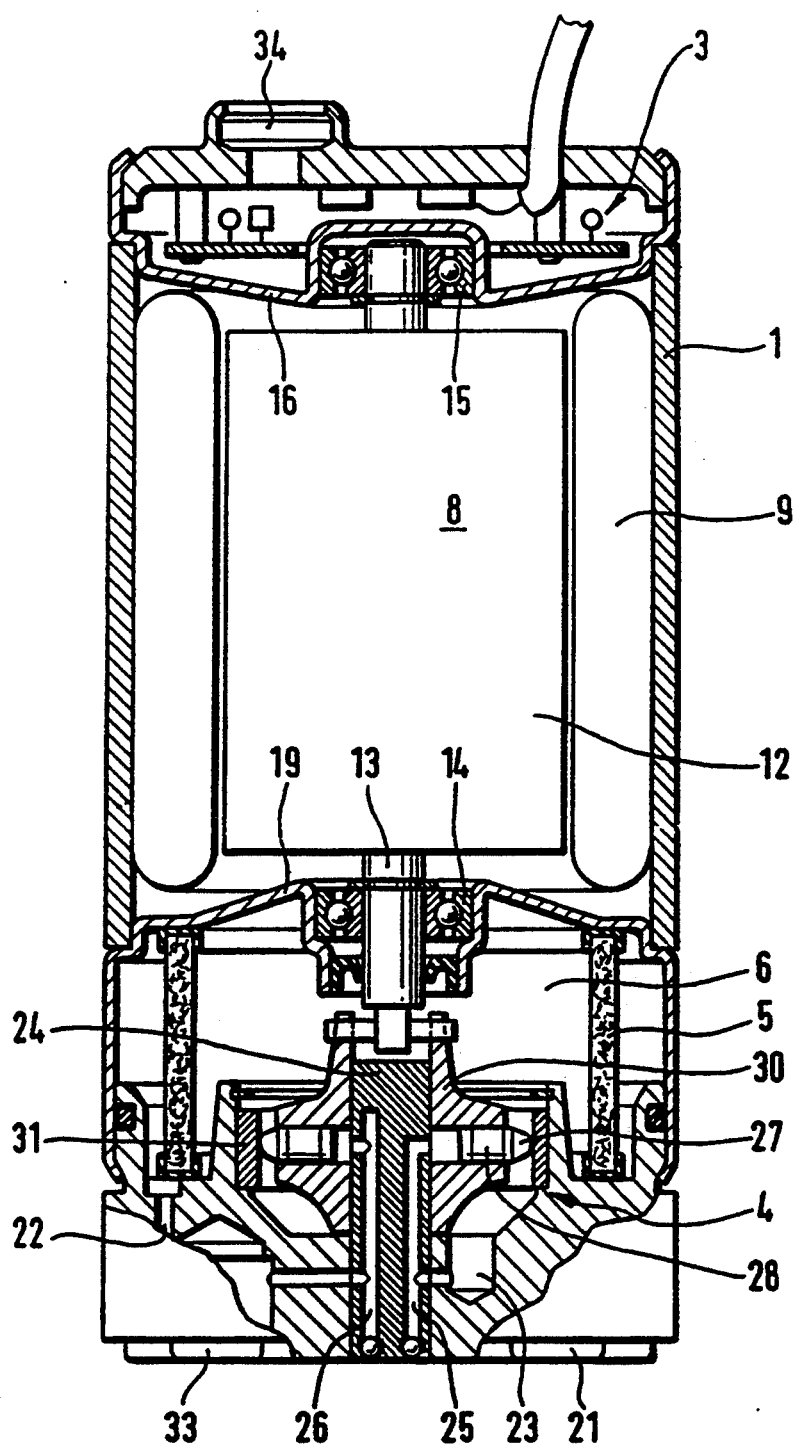
FIG. 4 shows a motor-and-pump assembly with a motor without commutator.

FIG. 4 shows a further embodiment, the motor 2 being designed as a motor without commutator. In this case the magnets 12 form the rotor 8, and the winding 9 is positioned outside and does not rotate. This motor 2 requires less space than conventional motors. The coupling between the motor shaft 13, being supported on either side of the rotor 8 and the pump rotor 30 is particularly advantageous.

Figure 5:
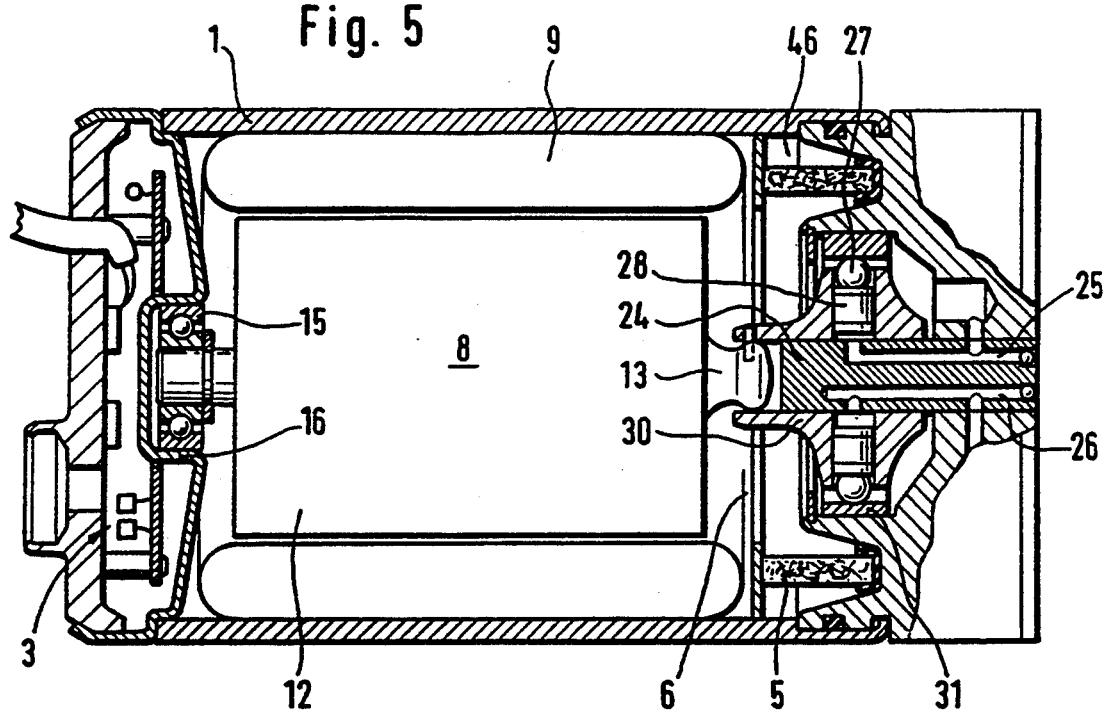
FIG. 5 shows another motor-and-pump assembly with a dipped motor.
Figure 6:
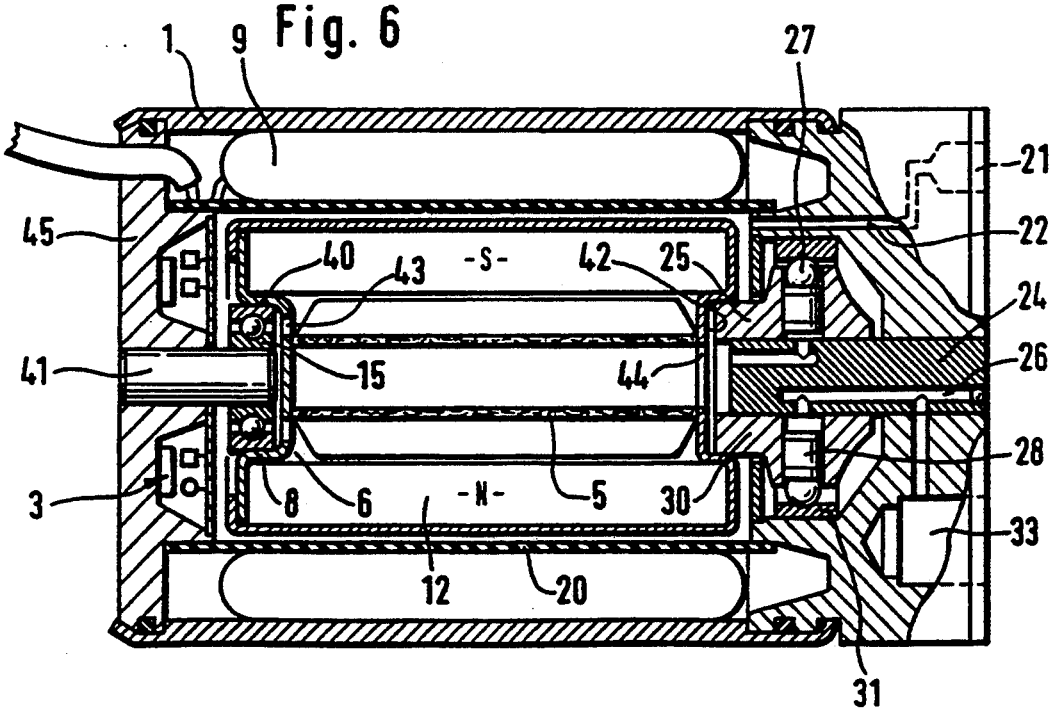
FIG. 6 shows an extremely compact arrangement of the motor without commutator with integrated control apparatus, common bearing of the rotors of the motor and pump and filter in the motor range.

In FIGS. 5 and 6, the motor 2 is in each instance designed as a motor without commutator and is, in addition, "dipped", that is to say, in each of these embodiments, the motor rotor 8 runs in the hydraulic fluid. In the embodiment according to FIG. 6, the windings 9 are protected against moisture by the diaphragm 20. In the embodiment in FIG. 5 the windings are positioned in the hydraulic pressure fluid and will, therefore, be particularly well cooled. From the inlet connection, a link, not shown in the drawing, exists to the annular chamber 48. From the annular chamber 48 the hydraulic pressure fluid is passed through the filter 5 into the tank 6.

In the embodiment in FIG. 5, the motor shaft 13 is, moreover, supported separately only on the side of the motor 2 facing away from the hydraulic section 4 and coupled directly to the pump rotor 30 and simultaneously supported through the latter on the side of the pump. This measure affords a further reduction in size of the motor-and-pump assembly.

The design according to FIG. 6 is extremely compact. The motor shaft 13 is again supported separately only on the side of the control apparatus 3. The bearing 15 is provided in a recess 40 of the motor rotor 8 on a bearing pin 41 in order to save space. On the other side of the rotor 8 there is a further recess 42 into which the pump rotor partly projects. Due to a special routing of the hydraulic pressure fluid to be supplied, the tank 8 is positioned in the range of the motor rotor 8. The hydraulic pressure fluid flows from the inlet connection 21 through the axial duct 22 between the motor rotor 8 and the diaphragm 20 to the end facing the control apparatus 3. From there it flows through openings 43 in the recess 40 into the interior space of the rotor, through the filter 5 and a central opening 44 in the recess 42 to the suction duct 25. It is conveyed by the pump 4 through the discharge duct 28 to the outlet connection 33.

The control apparatus 3 is integrated in the cover lid 45 of the electric motor. Cover lid 45 also serves as a retaining means for the bearing pin 41. The windings 9, the cover lid 45 and the bearing pin 41 form one module. A second module is formed by the hydraulic section 4, the housing 1 making part of one of said modules an option. In assembly, the motor rotor 8 with the bearing parts 15 will be inserted between both modules and be retained by the latter.

We claim:

1. A hydraulic pump assembly, comprising:
    a housing having side walls defining an inner chamber,
    an electric motor disposed in said inner chamber, said motor having an output shaft adapted to rotate about an axis of rotation,
    a hydraulic pump section disposed in said inner chamber and coupled to said output shaft,
    a cylindrical filter disposed in said inner chamber, said cylindrical filter having an axis coincident with said axis of rotation of said output shaft.

2. A hydraulic pump assembly as claimed in claim 1, further including a control apparatus disposed in said inner chamber and electrically coupled to said motor.

3. A hydraulic pump assembly as claimed in claim 2, wherein said hydraulic pump section, and said control apparatus form a pre-assembled unit, said electric motor being adapted to be joined to said pre-assembled unit.

4. A hydraulic pump assembly as claimed in claim 2, wherein said side walls of said housing define an opening adapted to matingly engage a side wall of said hydraulic pump section wherein said hydraulic pump section is securable to said side walls of said housing by cold-working said side walls.

5. A hydraulic pump assembly as claimed in claim 1, wherein said electric motor includes a rotor portion positioned in the hydraulic fluid.

6. A hydraulic pump assembly as claimed in claim 1, wherein said hydraulic pump section includes a slot-controlled radial piston pump.

7. A hydraulic pump assembly as claimed in claim 1, further including a tank mounted within said inner chamber.

8. The hydraulic pump assembly of claim 1, wherein said electric motor output shaft is supported only by first and second bearings, said first bearing located at a first end of said output shaft and said second bearing located at said hydraulic pump section.

9. The hydraulic pump assembly of claim 1, wherein said electric motor includes a rotor having first and second opposing ends, said opposing ends including recesses for receipt of said first and second bearings respectively.

10. The hydraulic pump assembly of claim 1, wherein said electric motor includes a rotor and a winding, said rotor and winding being separated by a fluid impermeable barrier, said hydraulic pump section being adapted to route fluid about said rotor to facilitate cooling of said rotor.

* * * * *